United States Patent
Chen et al.

(10) Patent No.: US 10,585,600 B2
(45) Date of Patent: Mar. 10, 2020

(54) DATA ACCESS METHOD AND APPARATUS

(71) Applicant: Huawei Technologies Co., Ltd., Shenzhen (CN)

(72) Inventors: Xiaoliang Chen, Nanjing (CN); Yuqing Shi, Shenzhen (CN); Yong Lei, Shenzhen (CN); Tianke Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 276 days.

(21) Appl. No.: 15/203,645

(22) Filed: Jul. 6, 2016

(65) Prior Publication Data

US 2016/0313937 A1  Oct. 27, 2016

Related U.S. Application Data

(63) Continuation of application No. PCT/CN2014/095668, filed on Dec. 30, 2014.

(30) Foreign Application Priority Data

Jan. 7, 2014 (CN) .......................... 2014 1 0007103

(51) Int. Cl.
 *G06F 3/06* (2006.01)
(52) U.S. Cl.
 CPC ............ *G06F 3/0619* (2013.01); *G06F 3/061* (2013.01); *G06F 3/0634* (2013.01);
 (Continued)

(58) Field of Classification Search
 CPC ........ G06F 3/0689; G06F 3/0688; G06F 3/06; G06F 3/0604; G06F 3/061; G06F 3/0619;
 (Continued)

(56) References Cited

U.S. PATENT DOCUMENTS 5,913,927 A 6/1999 Nagaraj et al.
8,049,980 B1 11/2011 Emami
(Continued)

FOREIGN PATENT DOCUMENTS

CN 102023809 A 4/2011
CN 102207895 A 10/2011
(Continued)

OTHER PUBLICATIONS

Partial English Translation and Abstract of Chinese Patent Application No. CN102023809, Jul. 19, 2019, 6 pages.
(Continued)

*Primary Examiner* — Larry T Mackall
(74) *Attorney, Agent, or Firm* — Conley Rose, P.C.

(57) ABSTRACT

A data access method and apparatus, where the method includes acquiring a data read request that is for a first disk group and carries a read address, determining a first-stripe location range of the first disk group according to the read address, sequentially reading data from first stripes within the first-stripe location range, setting a data reading result for a first stripe whose data is not successfully read to preset padding data, continuing to read data from a next first stripe until data is read from all the first stripes, and returning a data reading result for each first stripe. Thus the method and apparatus may reduce data loss and shortens access interruption time when data is not successfully read.

20 Claims, 7 Drawing Sheets

(52) U.S. Cl.
CPC .......... *G06F 3/0659* (2013.01); *G06F 3/0689* (2013.01); *G06F 3/0638* (2013.01); *G06F 3/0647* (2013.01)

(58) Field of Classification Search
CPC ...... G06F 3/0634; G06F 3/0638; G06F 3/064; G06F 3/0647; G06F 3/0653; G06F 3/0659; G06F 11/10; G06F 11/1076; G06F 12/16; G06F 2211/103; G06F 2211/1059
See application file for complete search history.

(56) References Cited

U.S. PATENT DOCUMENTS

| | | | |
|---|---|---|---|
| 8,417,987 B1 | 4/2013 | Goel et al. | |
| 2002/0162076 A1 | 10/2002 | Talagala et al. | |
| 2003/0185142 A1 | 10/2003 | Ohbi et al. | |
| 2004/0015657 A1 | 1/2004 | Humlicek et al. | |
| 2005/0114728 A1 | 5/2005 | Aizawa et al. | |
| 2007/0083709 A1 | 4/2007 | Hajji | |
| 2009/0172277 A1* | 7/2009 | Chen | G06F 3/0617 711/114 |
| 2010/0005239 A1* | 1/2010 | Hur | G11B 20/1816 711/112 |
| 2010/0125695 A1* | 5/2010 | Wu | G06F 3/0613 711/103 |
| 2011/0296129 A1* | 12/2011 | Arai | G06F 13/28 711/165 |
| 2014/0149826 A1* | 5/2014 | Lu | G06F 11/108 714/764 |
| 2015/0130952 A1* | 5/2015 | Wang | H04N 17/004 348/192 |

FOREIGN PATENT DOCUMENTS

| | | |
|---|---|---|
| CN | 102226892 A | 10/2011 |
| CN | 104007936 A | 8/2014 |
| EP | 2180407 A2 | 4/2010 |
| JP | H11232048 A | 8/1999 |
| JP | 2005157739 A | 6/2005 |
| JP | 2012238197 A | 12/2012 |
| RU | 2303822 C2 | 7/2007 |
| RU | 2305330 C2 | 8/2007 |

OTHER PUBLICATIONS

Partial English Translation and Abstract of Chinese Patent Application No. CN102207895, Jul. 19, 2016, 7 pages.
Partial English Translation and Abstract of Chinese Patent Application No. CN102226892, Jul. 19, 2016, 4 pages.
Partial English Translation and Abstract of Chinese Patent Application No. CN104007936, Jul. 19, 2016, 4 pages.
Foreign Communication From a Counterpart Application, European Application No. 14878327.7, Extended European Search Report dated Oct. 10, 2016, 8 pages.
Foreign Communication From a Counterpart Application, PCT Application No. PCT/CN2014/095668, English Translation of International Search Report dated Mar. 27, 2015, 2 pages.
Foreign Communication From a Counterpart Application, PCT Application No. PCT/CN2014/095668, English Translation of Written Opinion dated Mar. 31, 2015, 12 pages.
Machine Translation and Abstract of Russian Publication No. RU2303822, Jul. 27, 2007, 42 pages.
Machine Translation and Abstract of Japanese Publication No. JP2012238197, Dec. 6, 2012, 19 pages.
Machine Translation and Abstract of Japanese Publication No. JPH11232048, Aug. 27, 1999, 22 pages.
Foreign Communication From a Counterpart Application, Russian Application No. 2016132295, Russian Search Report dated Apr. 12, 2017, 2 pages.
Foreign Communication From a Counterpart Application, Russian Application No. 2016132295, Russian Notice of Allowance dated Apr. 25, 2017, 14 pages.
Foreign Communication From a Counterpart Application, Russian Application No. 2016132295, English Translation of Russian Notice of Allowance dated Apr. 25, 2017, 8 pages.
Foreign Communication From a Counterpart Application, Japanese Application No. 2016-544792, Japanese Office Action dated Jun. 20, 2017, 4 pages.
Foreign Communication From a Counterpart Application, Japanese Application No. 2016-544792, English Translation of Japanese Office Action dated Jun. 20, 2017, 5 pages.

* cited by examiner

DATA ACCESS METHOD AND APPARATUS

CROSS-REFERENCE TO RELATED APPLICATIONS

This application is a continuation of International Application No. PCT/CN2014/095668, filed on Dec. 30, 2014, which claims priority to Chinese Patent Application No. 201410007103.0, filed on Jan. 7, 2014, both of which are hereby incorporated by reference in their entireties.

TECHNICAL FIELD

The present disclosure relates to the field of information technologies, and in particular, to a data access method and apparatus.

BACKGROUND

With rapid development of information technologies, a manner of storing data using devices is widely applied. However, a storage area of a device is exposed to damage risks, which causes losses of stored data and brings inconvenience and even unrecoverable losses to people. Requirements for data reliability vary in different fields, and for application scenarios in which data reliability is not strictly required, residual data in a storage area is also valuable. Therefore, it is an issue for people to consider how to reduce data loss in a case of a damaged storage area for effective data access.

In the prior art, a redundant array of independent disks (RAID) technology is used for data access, where multiple disks form a disk group, each disk is divided into multiple stripes, and data is segmented into multiple data blocks that are separately stored in different stripes of the multiple disks, where each stripe stores one data block. RAID5 is used as an example. RAID5 includes a disk group and the disk group includes n+1 disks, where n disks are used to store data for access and one disk is used to store redundancy data. When one disk in the disk group becomes faulty, unknown data in the faulty disk may be obtained by calculation using data on the other disks in the disk group, and then all the data can be accessed. When more than one disk in the disk group becomes faulty, unknown data in the faulty disks cannot be obtained by calculation using data on the other disks in the disk group. The disk group goes into a failed state, and data in the disk group cannot be accessed. In this case, a built-in RAID method or a third-party service may be used to access residual data in the disk group, where the residual data is the data on the other disks except the faulty disks in the disk group.

In a process of implementing the present disclosure, the inventor finds that the prior art has at least the following disadvantages.

When more than one disk becomes faulty, without another measure taken, all data in the disk group will be lost, and the data cannot be effectively accessed. In addition, even though a RAID built-in service manner or a third-party service manner is used to access data, the lack of real-time performance of a RAID service or a third-party service makes it impossible to read data conveniently and quickly, and also causes long-time interruption of a service. Moreover, when a third party is involved, data confidentiality cannot be ensured.

SUMMARY

To resolve the problem in the prior art, embodiments of the present disclosure provide a data access method and apparatus. The technical solutions are as follows.

According to a first aspect, a data access method is provided, where the method is applied to a RAID, the RAID includes at least a first disk group, the first disk group includes at least one disk, each disk is divided in advance into at least one stripe, and the method includes acquiring a data read request for the first disk group, where the data read request carries a read address, determining a first-stripe location range of the first disk group according to the read address, where at least one first stripe is included within the first-stripe location range, sequentially reading data from the at least one first stripe within the first-stripe location range, setting a data reading result for the current first stripe to preset padding data if data is not successfully read from a current first stripe, continuing to read data from a next first stripe until data is read from all the at least one first stripe, and returning a data reading result for each first stripe.

With reference to the first aspect, in a first possible implementation manner of the first aspect, the RAID further includes a second disk group, and the method further includes acquiring a data write request for the first disk group, where the data write request carries a write address, determining a second-stripe location range of the first disk group according to the write address, where at least one second stripe is included within the second-stripe location range, sequentially writing data into the at least one second stripe within the second-stripe location range, scanning to learn a state of the first disk group if data is not successfully written into a current second stripe, where the state of the first disk group is one of a read-only state, a normal read/write state, and a degraded state, and continuing to write data into a corresponding stripe in the second disk group until all data is written if the first disk group is in the read-only state.

With reference to the first possible implementation manner of the first aspect, in a second possible implementation manner of the first aspect, after scanning to learn a state of the first disk group, the method further includes sending an alarm in response if the first disk group is in the degraded state.

With reference to the first aspect to the first to the second possible implementation manners of the first aspect, in a third possible implementation manner of the first aspect, the method further includes checking whether a state of each disk in the first disk group has changed, where the state of the disk is one of a new-disk state, a normal state, and a faulty state, and formatting the first disk if a first disk in the first disk group changes from the faulty state to the new-disk state, dividing the formatted first disk into stripes, and setting a state of each stripe that is obtained by division to a not-written state.

With reference to the third possible implementation manner of the first aspect, in a fourth possible implementation manner of the first aspect, after setting a state of each stripe that is obtained by division to a not-written state, the method further includes during data reading from a stripe in the not-written state, setting a data reading result for the stripe in the not-written state to preset padding data.

With reference to the first aspect to the first to the fourth possible implementation manners of the first aspect, in a fifth possible implementation manner of the first aspect, the method further includes checking whether the first disk group is currently in a read-only state, where the read-only state indicates that at least two disks in the first disk group are in a faulty state, determining whether a last detected state of the first disk group is the read-only state if the first disk group is currently in a non-read-only state, and setting the state of the first disk group to the non-read-only state if the last detected state of the first disk group is the read-only state, where the non-read-only state includes a degraded state and a normal read/write state.

With reference to the fifth possible implementation manner of the first aspect, in a sixth possible implementation manner of the first aspect, after checking whether the first disk group is currently in a read-only state, the method further includes determining whether the last detected state of the first disk group is the non-read-only state if the first disk group is currently in the read-only state, and setting the state of the first disk group to the read-only state if the last detected state of the first disk group is the non-read-only state.

According to a second aspect, a data access apparatus is provided, where the apparatus is applied to a RAID, the RAID includes at least a first disk group, the first disk group includes at least one disk, each disk is divided in advance into at least one stripe, and the apparatus includes a first acquiring module configured to acquire a data read request for the first disk group, where the data read request carries a read address, a first determining module configured to determine a first-stripe location range of the first disk group according to the read address, where at least one first stripe is included within the first-stripe location range, a reading module configured to sequentially read data from the at least one first stripe within the first-stripe location range, a first setting module configured to set a data reading result for the current first stripe to preset padding data when data is not successfully read from a current first stripe, continue to read data from a next first stripe until data is read from all the at least one first stripe, and a returning module configured to return a data reading result for each first stripe.

With reference to the second aspect, in a first possible implementation manner of the second aspect, the RAID further includes a second disk group, and the apparatus further includes a second acquiring module configured to acquire a data write request for the first disk group, where the data write request carries a write address, a second determining module configured to determine a second-stripe location range of the first disk group according to the write address, where at least one second stripe is included within the second-stripe location range, a first writing module configured to sequentially write data into the at least one second stripe within the second-stripe location range, a scanning module configured to scan to learn a state of the first disk group when data is not successfully written into a current second stripe, where the state of the first disk group is one of a read-only state, a normal read/write state, and a degraded state, and a second writing module configured to continue to write data into a corresponding stripe in the second disk group until all data is written when the first disk group is in the read-only state.

With reference to the first possible implementation manner of the second aspect, in a second possible implementation manner of the second aspect, the apparatus further includes a responding module configured to send an alarm in response when the first disk group is in the degraded state.

With reference to the second aspect to the first to the second possible implementation manners of the second aspect, in a third possible implementation manner of the second aspect, the apparatus further includes a first checking module configured to check whether a state of each disk in the first disk group has changed, where the state of the disk is one of a new-disk state, a normal state, and a faulty state, and a formatting module configured to format a first disk when the first disk in the first disk group changes from the faulty state to the new-disk state, a dividing module configured to divide the formatted first disk into stripes, and a second setting module configured to set a state of each stripe that is obtained by division to a not-written state.

With reference to the third possible implementation manner of the second aspect, in a fourth possible implementation manner of the second aspect, the first setting module is further configured to, during data reading from a stripe in the not-written state, set a data reading result for the stripe in the not-written state to preset padding data.

With reference to the second aspect to the first to the fourth possible implementation manners of the second aspect, in a fifth possible implementation manner of the second aspect, the apparatus further includes a second checking module configured to check whether the first disk group is currently in a read-only state, where the read-only state indicates that at least two disks in the first disk group are in a faulty state, a third determining module configured to determine whether a last detected state of the first disk group is the read-only state when the first disk group is currently in a non-read-only state, and a third setting module configured to set the state of the first disk group to the non-read-only state when the last detected state of the first disk group is the read-only state, where the non-read-only state includes a degraded state and a normal read/write state.

With reference to the fifth possible implementation manner of the second aspect, in a sixth possible implementation manner of the second aspect, the apparatus further includes a fourth determining module configured to determine whether the last detected state of the first disk group is the non-read-only state when the first disk group is currently in the read-only state, and a fourth setting module configured to set the state of the first disk group to the read-only state when the last detected state of the first disk group is the non-read-only state.

The technical solutions provided by the embodiments of the present disclosure bring the following beneficial effects.

A data reading result for a first stripe whose data is not successfully read is set to preset padding data, data reading proceeds to a next first stripe until data is read from all first stripes, and a data reading result for each first stripe is returned, which reduces data loss and shortens access interruption time when data is not successfully read.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To access data, a device for storing the data needs to be determined. When a storage device is determined, performance, reliability, and costs of the storage device need to be considered. A RAID achieves a better balance among performance, reliability, and costs. Therefore, for most civil storage devices, a technology of RAID is used to build storage environments.

A data access method provided in embodiments of the present disclosure may be applied to not only scenarios of streaming media data storage, but also scenarios in which data reliability is not strictly required, such as scenarios of text storage and Internet caching.

To make the objectives, technical solutions, and advantages of the present disclosure clearer, the following further describes the embodiments of the present disclosure in detail with reference to the accompanying drawings.

Embodiment 1

Figure 1:
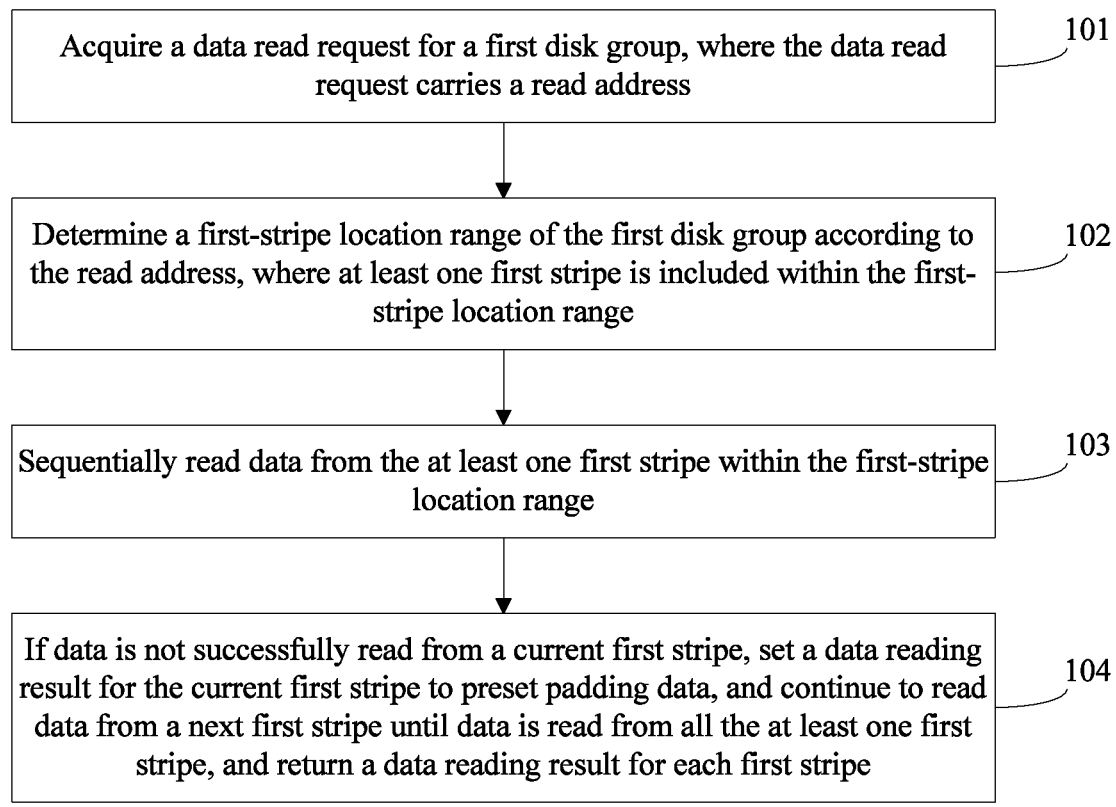
FIG. 1 is a flowchart of a data access method according to Embodiment 1 of the present disclosure.

An embodiment of the present disclosure provides a data access method, which is applied to a RAID. The RAID includes at least a first disk group, the first disk group includes at least one disk, and each disk is divided in advance into at least one stripe. Referring to FIG. 1, a method process provided in this embodiment includes the following steps.

Step 101: Acquire a data read request for a first disk group, where the data read request carries a read address.

Step 102: Determine a first-stripe location range of the first disk group according to the read address, where at least one first stripe is included within the first-stripe location range.

Step 103: Sequentially read data from the at least one first stripe within the first-stripe location range.

Step 104: If data is not successfully read from a current first stripe, set a data reading result for the current first stripe to preset padding data, and continue to read data from a next first stripe until data is read from all the at least one first stripe, and return a data reading result for each first stripe.

Preferably, the RAID further includes a second disk group, and the method further includes acquiring a data write request for the first disk group, where the data write request carries a write address, determining a second-stripe location range of the first disk group according to the write address, where at least one second stripe is included within the second-stripe location range, sequentially writing data into the at least one second stripe within the second-stripe location range, scanning to learn a state of the first disk group if data is not successfully written into a current second stripe, where the state of the first disk group is one of a read-only state, a normal read/write state, and a degraded state, and continuing to write data into a corresponding stripe in the second disk group until all data is written if the first disk group is in the read-only state.

Preferably, after scanning to learn a state of the first disk group, the method further includes sending an alarm in response if the first disk group is in the degraded state.

Preferably, the method further includes checking whether a state of each disk in the first disk group has changed, where the state of the disk is one of a new-disk state, a normal state, and a faulty state, and formatting the first disk if a first disk in the first disk group changes from the faulty state to the new-disk state, dividing the formatted first disk into stripes, and setting a state of each stripe that is obtained by division to a not-written state.

Preferably, after setting a state of each stripe that is obtained by division to a not-written state, the method further includes, during data reading from a stripe in the not-written state, setting a data reading result for the stripe in the not-written state to preset padding data.

Preferably, the method further includes checking whether the first disk group is currently in a read-only state, where the read-only state indicates that at least two disks in the first disk group are in a faulty state, determining whether a last detected state of the first disk group is the read-only state if the first disk group is currently in a non-read-only state, and setting the state of the first disk group to the non-read-only state if the last detected state of the first disk group is the read-only state, where the non-read-only state includes a degraded state and a normal read/write state.

Preferably, after checking whether the first disk group is currently in a read-only state, the method further includes determining whether the last detected state of the first disk group is the non-read-only state if the first disk group is currently in the read-only state, and setting the state of the first disk group to the read-only state if the last detected state of the first disk group is the non-read-only state.

In the method provided in this embodiment, data is sequentially read within a first-stripe location range of a first disk group, where the first-stripe location range is determined according to a read address that is carried in an acquired data read request for the first disk group, a data reading result for a first stripe whose data is not successfully read is set to preset padding data, data reading proceeds to a next first stripe until data is read from all first stripes, and a data reading result for each first stripe is returned, which reduces data loss and shortens access interruption time when data is not successfully read, and ensures data confidentiality because no third party is involved.

Embodiment 2

Figure 2:
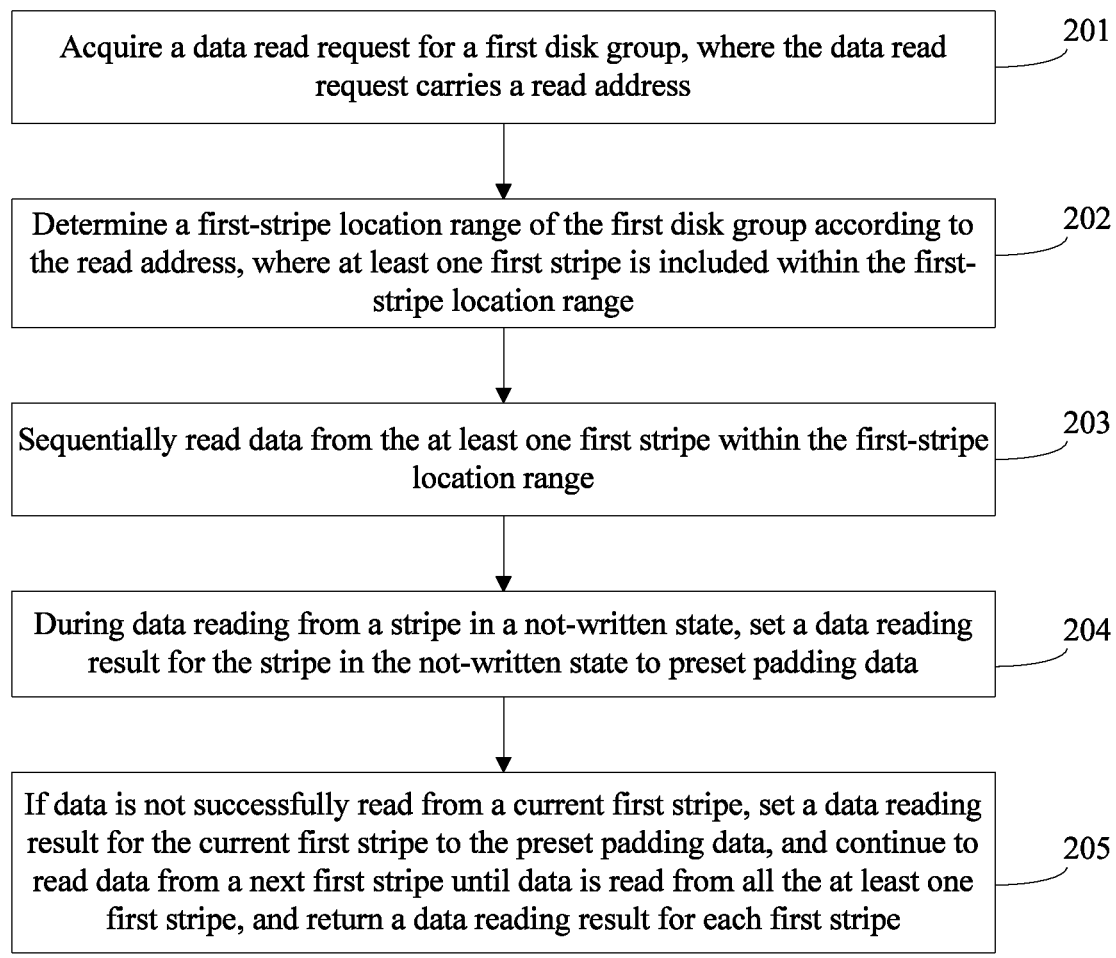
FIG. 2 is a flowchart of a data access method according to Embodiment 2 of the present disclosure.

An embodiment of the present disclosure provides a data access method, which is applied to a RAID. The RAID includes at least a first disk group, the first disk group includes at least one disk, and each disk is divided in advance into at least one stripe. With reference to the content of the foregoing Embodiment 1, the method provided in this embodiment of the present disclosure is explained and described in detail. Referring to FIG. 2, a method process includes the following steps.

Step 201: Acquire a data read request for a first disk group, where the data read request carries a read address.

A manner of acquiring the data read request is not limited in this embodiment. In specific implementation, a manner of receiving a message may be used to acquire the data read request. Certainly, in addition to the foregoing manner, another manner may also be used.

Further, to determine a read range, the data read request carries the read address, according to which the read range is determined. In addition to carrying the read address, the data read request may further carry other information, which is not limited in this embodiment. For example, the data read request carries a read sequence.

Step 202: Determine a first-stripe location range of the first disk group according to the read address, where at least one first stripe is included within the first-stripe location range.

Furthermore, determining a first-stripe location range of the first disk group according to the read address includes but is not limited to computing, according to the read address, first disks in the first disk group that are corresponding to the read address, and computing a first-stripe location range of each first disk, where the first-stripe location range of the first disk group is a collection of the first-stripe location ranges of the first disks. Certainly, in addition to the foregoing manner, another manner may be used to determine the first-stripe location range of the first disk group according to the read address, which is not limited in this embodiment.

It should be noted that at least one first stripe is included within the first-stripe location range, and data may be sequentially read from the at least one first stripe within the first-stripe location range in a subsequent step.

For ease of understanding, that the first disk group includes disks D1 to D8 is used as an example for description. A read address is stripe 1 on D1 to stripe 1 on D4, where stripe 1 on D1 is stripe 1 on the disk D1 and stripe 1 of D4 is stripe 1 on the disk D4. Computed according to the read address, first disks in the first disk group that are corresponding to the read address are D1 to D4. It is computed that a first-stripe location range of the disk D1 is stripe 1, that a first-stripe location range of the disk D2 is stripe 1, that a first-stripe location range of the disk D3 is stripe 1, and that a first-stripe location range of the disk D4 is stripe 1. Therefore, the first-stripe location range of the first disk group includes stripe 1 on the disk D1, stripe 1 on the disk D2, stripe 1 on the disk D3, and stripe 1 on the disk D4. That is, four first stripes are included within the first-stripe location range.

Step 203: Sequentially read data from the at least one first stripe within the first-stripe location range.

The first-stripe location range of the first disk group has been determined according to the read address, and therefore, data may be sequentially read from the at least one first stripe within the first-stripe location range directly. A manner of reading data from a stripe is not limited in this embodiment. For example, if data to be accessed is consecutive data, data that is not requested may be read in advance, and the read data is stored in a memory. After a data read request is acquired, the data is directly read from the memory, thereby increasing a speed of data reading. For another example, if data to be accessed is random data, the data is directly read from a corresponding storage area after a data read request is acquired.

Step 204: During data reading from a stripe in a not-written state, set a data reading result for the stripe in the not-written state to preset padding data.

To be able to determine a state of a stripe, the method provided in this embodiment further includes checking whether a state of each disk in the first disk group has changed, where the state of the disk is one of a new-disk state, a normal state, and a faulty state, formatting the first disk if a first disk in the first disk group changes from the faulty state to the new-disk state, dividing the formatted first disk into stripes, and setting a state of each stripe that is obtained by division to a not-written state.

A manner of triggering a check on the state of each disk in the first disk group is not limited in this embodiment. In specific implementation, a check on a state of a disk may be triggered regularly. Certainly, in addition to the foregoing manner, another manner may also be used to trigger a check on the state of the disk. The state of the disk is one of the new-disk state, the normal state, and the faulty state. A disk in the new-disk state is a disk that is newly inserted into a disk group, a disk in the normal state is a disk from which data can be read and into which data can be written in the disk group, and a disk in the faulty state is a disk that is faulty or is removed from the disk group.

If the first disk in the first group changes from the faulty state to the new-disk state, the first disk may be manually replaced with a new disk. To normally use the new first disk, the new first disk is formatted, the formatted first disk is divided into stripes, and a state of each stripe that is obtained by division is set to the not-written state. States of a stripe are not limited in this embodiment, and the states of a stripe include but are not limited to a written state and the not-written state. It should be noted that, after the first disk is formatted, and the formatted first disk is divided into stripes, data may be normally read from and written into the first disk, and the first disk changes from the new-disk state to the normal state.

Figure 3:
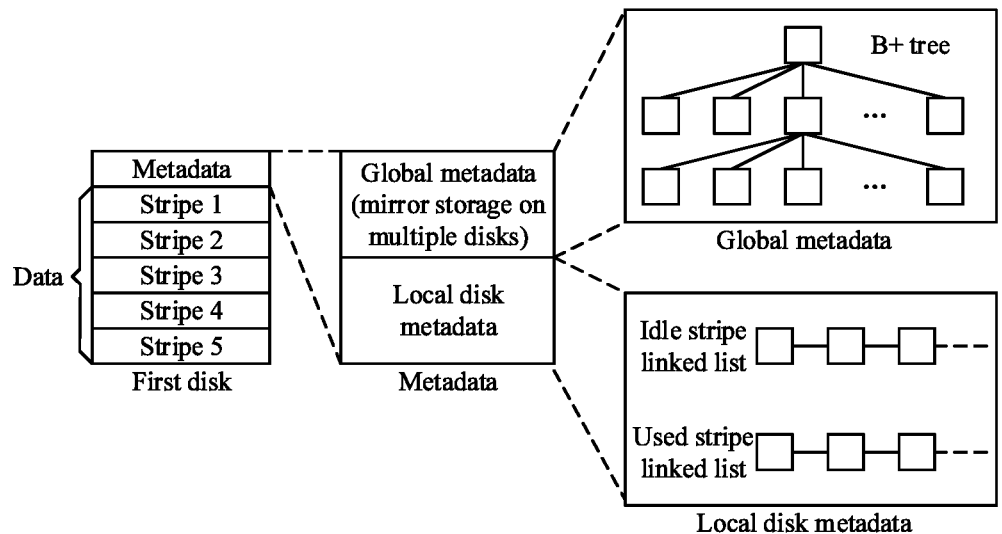
FIG. 3 is a schematic diagram of a structure of a first disk according to Embodiment 2 of the present disclosure.

For ease of understanding, a first disk shown in FIG. 3 is used as an example for description. The first disk is divided into two areas for storing data, which are respectively a data area and a metadata area. The data area is divided into stripe 1 to stripe 5, and states of stripe 1 to stripe 5 are all set to the not-written state because the first disk has changed from the faulty state to the new-disk state. The metadata area is further divided into a global metadata area and a local disk metadata area. In the global metadata area, metadata of a first disk group is stored in a form of a B+tree. In the local disk metadata area, according to the metadata of the first disk group that is stored in the global metadata area, an identifier of a stripe in the not-written state on the first disk is stored in an "idle stripe linked list", and an identifier of a stripe in the written state on the first disk is stored in a "used stripe linked list". The metadata of the first disk group is stored in a global metadata area of each first disk in the first disk group in a mirroring manner, that is, the same metadata of the first disk group is recorded in the global metadata area of each first disk in the first disk group.

In addition, a size of a divided stripe is not limited in this embodiment. In specific implementation, different division may be performed according to different data. Using streaming media data as an example, especially for a high-definition video, when data in one or two stripes is lost, only several picture frames may be damaged. With a playback rate of 25 frames per second, the several picture frames that are damaged do not have a significant visual impact. A great majority of decoders and players can tolerate such an error. As data in damaged stripes increases, the playback of the video may become intermittent. In a scenario of video surveillance, such video data is generally of great importance.

Figure 4A:
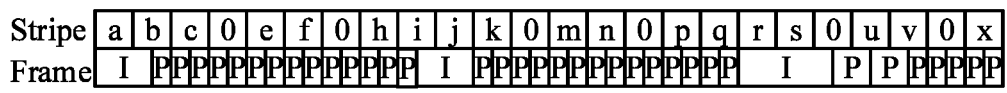
FIGS. 4A and 4B are schematic diagrams of divided stripes according to Embodiment 2 of the present disclosure.

For ease of understanding, stripes obtained by division and shown in FIG. 4A are used as an example for description. The first row is the stripes obtained by division, a stripe size is 1 megabyte (MB), data a, b, c, e, f, h, i, j, k, m, n, p, q, r, s, u, v, and x in the stripes is not lost, and data in stripes marked with 0 is lost. The second row is video data types, where I represents a key frame (I-frame), P represents a forward-predicted frame (P-frame), and I-frames and P-frames corresponding to the stripes marked with 0 are damaged frames. When data is read subsequently, data is successfully read from stripes corresponding to the first I-frame and the first to the third P-frames, and can be rendered to a screen, data is not successfully read from stripes corresponding to the fourth P-frame and the fifth P-frame, and if a decoder obtains garbled data, artifacts are displayed on the screen for a short time. For a display effect of subsequent frames, reference may be made to the foregoing content. For video data with an 8 megabits per second (Mbps) bit rate, the video is mostly played smoothly with occasional frame freezing and few artifacts.

Figure 4B:
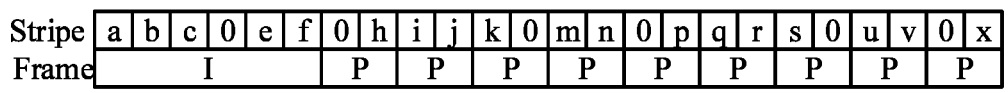

For another example, stripes obtained by division and shown in FIG. 4B are used as an example for description. The first row is the stripes obtained by division, and a stripe size is 256 kilobyte (KB). The second row is video data types, where a bit rate is the same as that in FIG. 4A. As can be seen from FIG. 4B, when a quantity of stripes that are corresponding to a frame increases, a quantity of damaged stripes also increases. Therefore, a proper stripe size is related to a bit rate of media data. A larger stripe size can reduce a probability that I-frames are continuously damaged, but a quantity of frames included in one stripe also increases, and more frames are skipped when the media data is played. A smaller stripe size increases the probability that I-frames are continuously damaged, which results in poor effect of media data playback. For a 1080 p video at an 8 Mbps bit rate, a stripe size of 1 MB is a better choice. For a video file at another bit rate, a stripe size may be discretionarily reduced according to the foregoing proportion of a bit rate to a stripe size.

Further, during data reading from a stripe in the not-written state, a data reading result for the stripe in the not-written state is set to preset padding data. Because no data is stored in the stripe in the not-written state, during data reading from the stripe in the not-written state, data is not actually read, but the data reading result for the stripe in the not-written state is set to the preset padding data. A numeric value of the preset padding data is not limited in this embodiment. In specific implementation, the numeric value of the preset padding data may be zero. Certainly, in addition to the foregoing numeric value, another value may be preset.

Step 205: If data is not successfully read from a current first stripe, set a data reading result for the current first stripe to the preset padding data, and continue to read data from a next first stripe until data is read from all the at least one first stripe, and return a data reading result for each first stripe.

To ensure that data can further be read from another first disk in the disk group when more than one first disk in the first disk group is in the faulty state, in the method provided in this embodiment, when data is not successfully read from a current first stripe, a data reading result for the current first stripe is set to the preset padding data, and data reading proceeds to a next first stripe. For the preset padding data, reference may be made to the content of the foregoing step 204, and details are not described herein again. After data is read from all the at least one first stripe within the first-stripe location range, a data reading result for each first stripe is returned, thereby avoiding a case that data cannot be read from any first disk in the first group when the first disk group fails.

Figure 5:
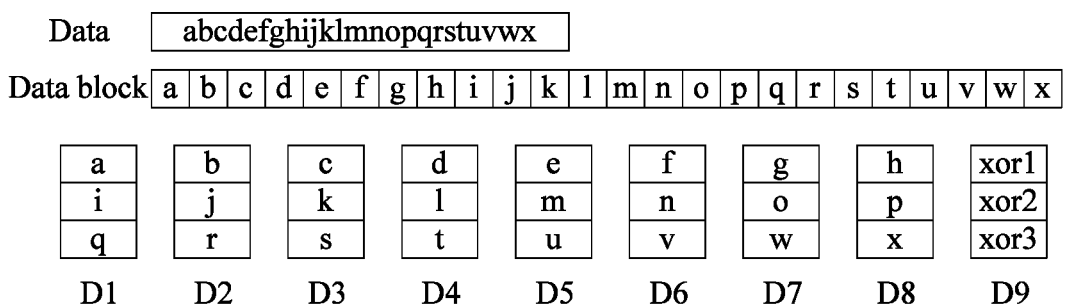
FIG. 5 is a schematic diagram of a structure of a first type of first disk group according to Embodiment 2 of the present disclosure.

It should be noted that in RAID5, if one disk is in the faulty state, data on the disk may be restored according to redundancy data in a disk group. For ease of understanding, a first disk group shown in FIG. 5 is used as an example. The first disk group includes nine disks, D1 to D9. Data abcdefghijklmnopqrstuvwx is segmented into data blocks a, b, c, d, e, f, g, h, i, j, k, 1, m, n, o, p, q, r, s, t, u, v, w, and x, which are respectively stored in stripes of the disks D1 to D9. Data a, i, and q are respectively stored in three stripes of the disk D1, data b, j, and r are respectively stored in three stripes of the disk D2, data c, k, and s are respectively stored in three stripes of the disk D3, data d, 1, and t are respectively stored in three stripes of the disk D4, data e, m, and u are respectively stored in three stripes of the disk D5, data f, n, and v are respectively stored in three stripes of the disk D6, data g, o, and w are respectively stored in three stripes of the disk D7, and data h, p, and x are respectively stored in three stripes of the disk D8. Redundancy data xor1, xor2, and xor3 are respectively stored in three stripes of the disk D9. $xor1 = a\hat{\ }b\hat{\ }c\hat{\ }d\hat{\ }e\hat{\ }f\hat{\ }g\hat{\ }h$, $xor2 = i\hat{\ }j\hat{\ }k\hat{\ }l\hat{\ }m\hat{\ }n\hat{\ }o\hat{\ }p$ and $xor3 = q\hat{\ }r\hat{\ }s\hat{\ }t\hat{\ }u\hat{\ }v\hat{\ }w\hat{\ }x$, where ^ represents exclusive OR logic gate. When any one disk of D1 to D8 is in the faulty state, data in the faulty disk may be restored by means of redundancy calculation.

For example, when the disk D3 is in the faulty state, a redundancy calculation process for data c is:

$$xor1 \hat{\ } a \hat{\ } b \hat{\ } d \hat{\ } e \hat{\ } f \hat{\ } g \hat{\ } h = (a \hat{\ } b \hat{\ } c \hat{\ } d \hat{\ } e \hat{\ } f \hat{\ } g \hat{\ } h) \hat{\ } a \hat{\ } b \hat{\ } d \hat{\ } e \hat{\ } f \hat{\ } g \hat{\ } h =$$
$$(a \hat{\ } a) \hat{\ } (b \hat{\ } b) \hat{\ } c \hat{\ } (d \hat{\ } d) \hat{\ } (e \hat{\ } e) \hat{\ } (f \hat{\ } f) \hat{\ } (g \hat{\ } g) \hat{\ } (h \hat{\ } h) =$$
$$0 \hat{\ } 0 \hat{\ } c \hat{\ } 0 \hat{\ } 0 \hat{\ } 0 \hat{\ } 0 \hat{\ } 0 = c$$

For redundancy calculation processes for data k and data s, reference may be made to the redundancy calculation process for data c, and details are not described herein again.

Figures 6, 7:
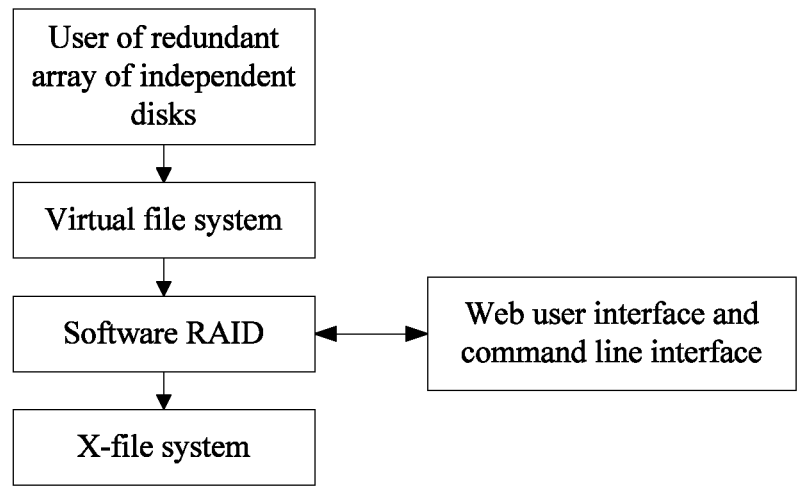
FIG. 6 is a schematic diagram of a structure of a second type of first disk group according to Embodiment 2 of the present disclosure.
FIG. 7 is a schematic diagram of a structure of software for data access according to Embodiment 2 of the present disclosure.

For another example, the disks D4 and D7 are in the faulty state. As shown in FIG. 6, data on the disks D4 and D7 cannot be obtained by means of redundancy calculation, and therefore, the data cannot be successfully read from the disks D4 and D7. The preset padding data is set to 0, and data reading results for the disks D4 and D7 are both Os. If the first-stripe location range of the first disk group that is determined according to the read address is all stripes of D1 to D8, a returned data reading result is abc0ef0hijk0mn0pqrs0uv0x.

Figure 8A:
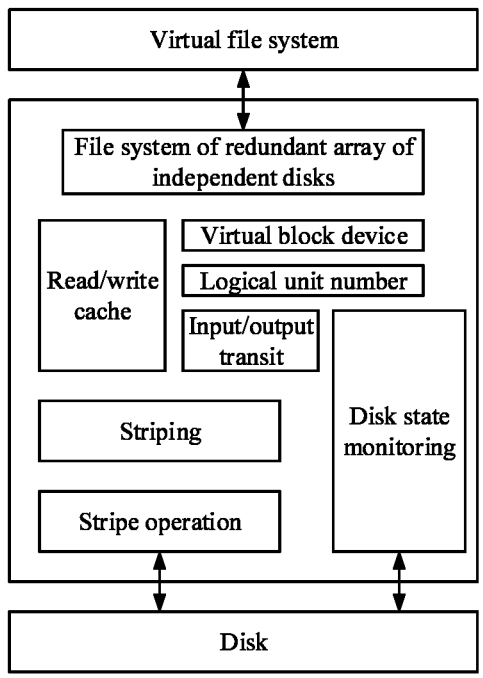
FIGS. 8A and 8B are schematic diagrams of a structure of a software RAID according to Embodiment 2 of the present disclosure.
Figure 8B:
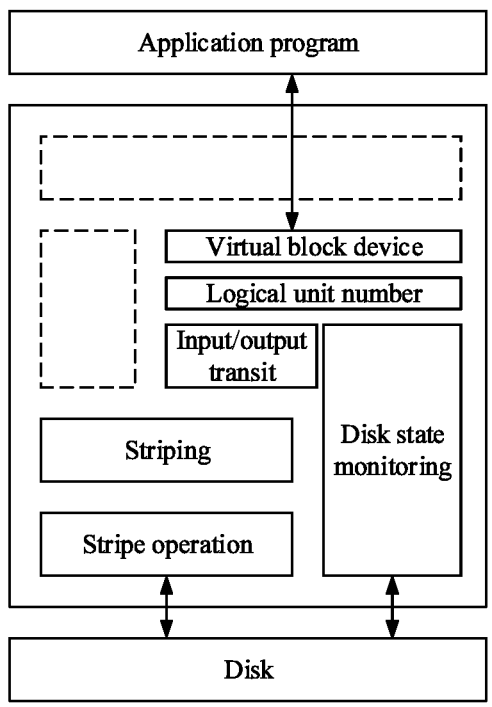

Further, the data access method provided in this embodiment of the present disclosure may be implemented by means of software, or be implemented by means of hardware. For ease of understanding, a structure of software for data access shown in FIG. 7 is used as an example for description. Software RAID is located between a virtual file system (VFS) and an X-File System (XFS), and a web user interface (WebUI) and a command line interface (CLI) are provided for controlling the software RAID, where a RAID user can control the software RAID using the VFS. A structure of the software RAID may be shown in FIG. 8A or may be shown in FIG. 8B. Compared with the software RAID in FIG. 8A, the software RAID in FIG. 8B is not provided with a RAID file system and a read/write cache, and a virtual block device is directly connected to a standard file system. When a disk group meets a failure condition, lost data may be key data in a standard file, which results in damage to the standard file system. Therefore, the software RAID is generally not applied to a file system.

Figure 9:
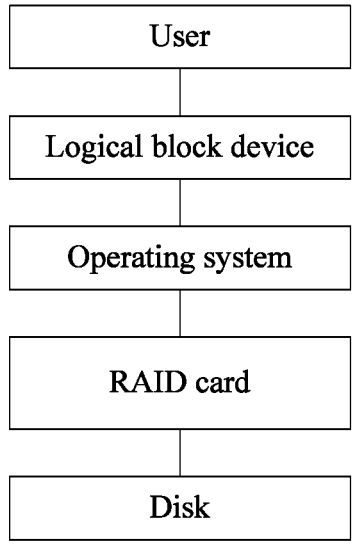
FIG. 9 is a schematic diagram of a structure of hardware for data access according to Embodiment 2 of the present disclosure.

In addition, in a structure of hardware for data access shown in FIG. 9, a RAID card can be used to implement the data access method provided in this embodiment of the present disclosure. The RAID card is located between an operating system and a disk.

In the method provided in this embodiment, data is sequentially read within a first-stripe location range of a first disk group, where the first-stripe location range is determined according to an acquired read address that is carried in a data read request for the first disk group, a data reading result for a first stripe whose data is not successfully read is set to preset padding data, data reading proceeds to a next first stripe until data is read from all first stripes, and a data reading result for each first stripe is returned, which reduces data loss and shortens access interruption time when data is not successfully read, and ensures data confidentiality because no third party is involved.

Embodiment 3

Figure 10:
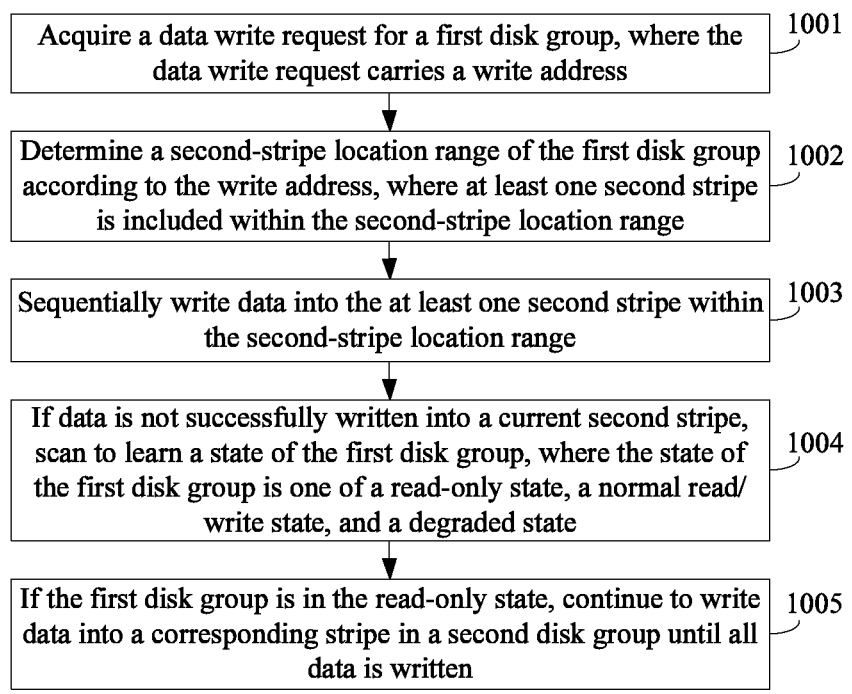
FIG. 10 is a flowchart of a data access method according to Embodiment 3 of the present disclosure.

An embodiment of the present disclosure provides a data access method, which is applied to a RAID. The RAID includes a first disk group and a second disk group, both the first disk group and the second disk group include at least one disk, and each disk is divided in advance into at least one stripe. Referring to FIG. 10, a method process includes the following steps.

Step 1001: Acquire a data write request for a first disk group, where the data write request carries a write address.

The data write request for the first disk group is acquired for accessing data in the disk group. A manner of acquiring the data write request is not limited in this embodiment. In specific implementation, a manner of receiving a message may be used to acquire the data write request. Certainly, in addition to the foregoing manner, another manner may also be used.

Further, to determine a write range, the data write request carries the write address, according to which the write range is determined. In addition to carrying the write address, the data write request may further carry other information, which is not limited in this embodiment. For example, the data write request carries a write sequence.

Step 1002: Determine a second-stripe location range of the first disk group according to the write address, where at least one second stripe is included within the second-stripe location range.

Furthermore, determining a second-stripe location range of the first disk group according to the write address includes but is not limited to computing, according to the write address, first disks in the first disk group that are corresponding to the write address, and computing a second-stripe location range of each first disk, where the second-stripe location range of the first disk group is a collection of the second-stripe location ranges of the first disks. Certainly, in addition to the foregoing manner, another manner may be used to determine the second-stripe location range of the first disk group according to the write address, which is not limited in this embodiment.

It should be noted that at least one second stripe is included within the second-stripe location range, and data may be sequentially written into the at least one second stripe within the second-stripe location range in a subsequent step.

For ease of understanding, that the first disk group includes disks D1 to D8 is used as an example for description. A write address is stripe 1 on D1 to stripe 1 on D4, where stripe 1 on D1 is stripe 1 on the disk D1 and stripe 1 of D4 is stripe 1 on the disk D4. Computed according to the write address, first disks in the first disk group that are corresponding to the write address are D1 to D4. It is computed that a second-stripe location range of the disk D1 is stripe 1, that a second-stripe location range of the disk D2 is stripe 1, that a second-stripe location range of the disk D3 is stripe 1, and that a second-stripe location range of the disk D4 is stripe 1. Therefore, the second-stripe location range of the first disk group includes stripe 1 on the disk D1, stripe 1 on the disk D2, stripe 1 on the disk D3, and stripe 1 on the disk D4, that is, four second stripes are included within the second-stripe location range.

Step 1003: Sequentially write data into the at least one second stripe within the second-stripe location range.

The second-stripe location range of the first disk group has been determined according to the write address, and therefore, data may be sequentially written into the at least one second stripe within the second-stripe location range directly. A manner of writing data into a stripe is not limited in this embodiment. In specific implementation, to-be-written data may be segmented into multiple data blocks, and the data is written in parallel into the at least one second stripe within the second-stripe location range, thereby increasing a speed of data writing. Certainly, in addition to the foregoing manner, another manner may also be used.

Step 1004: If data is not successfully written into a current second stripe, scan to learn a state of the first disk group, where the state of the first disk group is one of a read-only state, a normal read/write state, and a degraded state.

To successfully write data into the RAID, in the method provided in this embodiment, scanning is performed to learn the state of the first disk group when the data is not successfully written into the current second stripe. It should be noted that, in addition to a case in which data is not successfully written into a current second stripe, scanning to learn the state of the first disk group may also be triggered regularly. The state of the first disk group is one of the read-only state, the normal read/write state, and the degraded state. In the read-only state, only a data read operation is allowed and a data write operation is not allowed for all first disks in the first disk group. In the normal read/write state, both the data read operation and the data write operation are allowed for all the first disks in the first disk group. In the degraded state, both the data read operation and the data write operation are allowed for all the first disks in the first disk group, and at least one first disk is in a faulty state. The degraded state is between the read-only state and the normal read/write state. For different redundant arrays of independent disks, states of the first disk group are corresponding to different states of first disks.

For ease of understanding, RAID5 is used as an example for description. If more than one first disk in the first disk group is in the faulty state, the state, learned by scanning, of the first disk group is the read-only state. If no first disk in the first disk group is in the faulty state, the state, learned by scanning, of the first disk group is the normal read/write state. If one first disk in the first disk group is in the faulty state, the state, learned by scanning, of the first disk group is the degraded state.

Step 1005: If the first disk group is in the read-only state, continue to write data into a corresponding stripe in a second disk group until all data is written.

If the first disk group is in the read-only state, data can only be read from the first disk group, but cannot be written into a stripe of the first disk group. To be able to continue writing data into the RAID, data writing proceeds to the corresponding stripe in the second disk group until all data is written.

Figure 11:
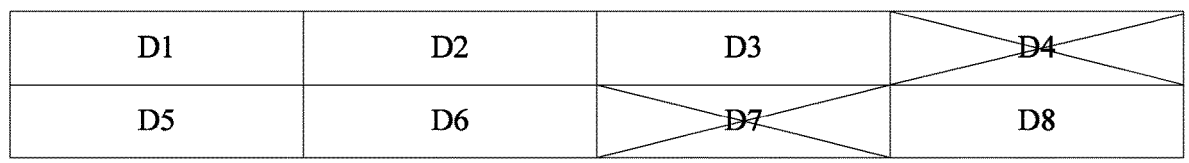
FIG. 11 is a schematic diagram of a display interface according to Embodiment 3 of the present disclosure.

Preferably, to restore the normal read/write state of the first disk group, the method provided in this embodiment further includes but is not limited to displaying a first disk that is in the faulty state in the first disk group. A manner of displaying the first disk is not further limited in this embodiment. For ease of understanding, a display interface shown in FIG. 11 is used as an example for description. Identifiers corresponding to all the first disks in the first disk group are displayed according to slot locations actually corresponding to the first disks and are D1 to D8 respectively. Locations of the disk D4 and the disk D7 are marked, which indicates that the disk D4 and the disk D7 are in the faulty state.

A location of a first disk that is in the faulty state has been marked, which facilitates manual replacement of the first disk. To check whether a first disk is replaced, the method provided in this embodiment includes but is not limited to checking whether a state of each disk in the first disk group has changed, where the state of the disk is one of a new-disk state, a normal state, and a faulty state, and formatting the first disk if a first disk in the first disk group changes from the faulty state to the new-disk state, dividing the formatted first disk into stripes, and setting a state of each stripe that is obtained by division to a not-written state.

Further, after checking whether a state of each disk in the first disk group has changed, the method provided in this embodiment further includes but is not limited to:

(1) Checking whether the first disk group is currently in a read-only state, where the read-only state indicates that at least two disks in the first disk group are in the faulty state. If the first disk group is currently in a non-read-only state, execute (2); and if the first disk group is currently in the read-only state, execute (4).

(2) Determining whether a last detected state of the first disk group is the read-only state.

(3) Setting the state of the first disk group to the non-read-only state, where the non-read-only state includes a degraded state and a normal read/write state if the last detected state of the first disk group is the read-only state.

(4) Determining whether a last detected state of the first disk group is the non-read-only state.

(5) Setting the state of the first disk group to the read-only state if the last detected state of the first disk group is the non-read-only state.

In addition, to avoid a failure condition of the disk group as much as possible, after the state of the first disk group is learned by scanning, if the state of the first disk group is the degraded state, an alarm is sent in response. When the state of the first disk group is the degraded state, it indicates that one first disk in the first disk group is in the faulty state. The alarm sent in response can be a reminder of manual disk replacement. A manner of sending an alarm in response is not limited in this embodiment. In specific implementation, a manner of sending alarm information may be used to send an alarm in response. In addition, location information of a disk may further be carried in the alarm information to facilitate disk replacement.

It should be noted that the data access method provided in this embodiment of the present disclosure may be implemented by means of software, or be implemented by means of hardware. For details, reference may be made to the specific description and content of software implementation and hardware implementation in the foregoing Embodiment 2, and details are not described herein again.

In the method provided in this embodiment of the present disclosure, when data is not successfully written into a current second stripe, it is learned by scanning that a first disk group is in a read-only state, and data writing proceeds to a corresponding stripe of a second disk group until all data is written, thereby implementing data writing without rebuilding a disk group, which shortens access interruption time and ensures data confidentiality because no third party is involved.

Embodiment 4

Figure 12:
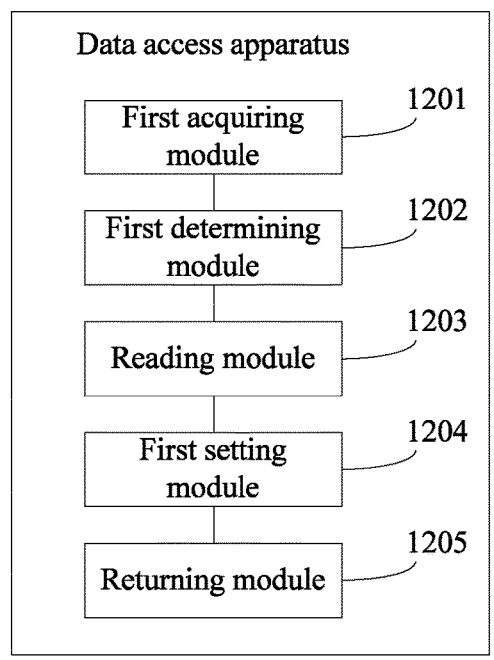
FIG. 12 is a schematic diagram of a structure of a data access apparatus according to Embodiment 4 of the present disclosure.

Referring to FIG. 12, an embodiment of the present disclosure provides a data access apparatus. The apparatus is applied to a RAID, where the RAID includes at least a first disk group, the first disk group includes at least one disk, and each disk is divided in advance into at least one stripe. The apparatus includes a first acquiring module 1201 configured to acquire a data read request for the first disk group, where the data read request carries a read address, a first determining module 1202 configured to determine a first-stripe location range of the first disk group according to the read address, where at least one first stripe is included within the first-stripe location range, a reading module 1203 configured to sequentially read data from the at least one first stripe within the first-stripe location range, a first setting module 1204 configured to set a data reading result for the current first stripe to preset padding data when data is not successfully read from a current first stripe, and continue to read data from a next first stripe until data is read from all the at least one first stripe, and a returning module 1205 configured to return a data reading result for each first stripe.

Preferably, the RAID further includes a second disk group, and the apparatus further includes a second acquiring module (not shown) configured to acquire a data write request for the first disk group, where the data write request carries a write address, a second determining module (not shown) configured to determine a second-stripe location range of the first disk group according to the write address, where at least one second stripe is included within the second-stripe location range, a first writing module (not shown) configured to sequentially write data into the at least one second stripe within the second-stripe location range, a scanning module (not shown) configured to scan to learn a state of the first disk group when data is not successfully written into a current second stripe, where the state of the first disk group is one of a read-only state, a normal read/write state, and a degraded state, and a second writing module (not shown) configured to continue to write data into a corresponding stripe in the second disk group until all data is written when the first disk group is in the read-only state.

Preferably, the apparatus further includes a responding module (not shown) configured to send an alarm in response when the first disk group is in the degraded state.

Preferably, the apparatus further includes a first checking module (not shown) configured to check whether a state of each disk in the first disk group has changed, where the state of the disk is one of a new-disk state, a normal state, and a faulty state, and a formatting module (not shown) configured to format a first disk when the first disk in the first disk group changes from the faulty state to the new-disk state, a dividing module (not shown) configured to divide the formatted first disk into stripes, and a second setting module (not shown) configured to set a state of each stripe that is obtained by division to a not-written state.

Preferably, the first setting module 1204 is further configured to set a data reading result for the stripe in the not-written state to preset padding data during data reading from a stripe in the not-written state.

Preferably, the apparatus further includes a second checking module (not shown) configured to check whether the first disk group is currently in a read-only state, where the read-only state indicates that at least two disks in the first disk group are in a faulty state, a third determining module (not shown) configured to determine whether a last detected state of the first disk group is the read-only state when the first disk group is currently in a non-read-only state, and a third setting module (not shown) configured to set the state of the first disk group to the non-read-only state when the last detected state of the first disk group is the read-only state, where the non-read-only state includes a degraded state and a normal read/write state.

Preferably, the apparatus further includes a fourth determining module (not shown) configured to determine whether the last detected state of the first disk group is the non-read-only state when the first disk group is currently in the read-only state, and a fourth setting module (not shown) configured to set the state of the first disk group to the read-only state when the last detected state of the first disk group is the non-read-only state.

According to the apparatus provided in this embodiment, data is sequentially read within a first-stripe location range of a first disk group, where the first-stripe location range is determined according to an acquired read address that is carried in a data read request for the first disk group, a data reading result for a first stripe whose data is not successfully read is set to preset padding data, data reading proceeds to a next first stripe until data is read from all first stripes, and a data reading result for each first stripe is returned, which reduces data loss and shortens access interruption time when data is not successfully read, and ensures data confidentiality because no third party is involved.

Embodiment 5

An embodiment of the present disclosure provides a data access terminal. The terminal is applied to a RAID, where the RAID includes at least a first disk group, the first disk group includes at least one disk, and each disk is divided in advance into at least one stripe. The terminal includes a processor, a transmitter, and a receiver.

The receiver is configured to acquire a data read request for the first disk group, where the data read request carries a read address.

The processor is configured to determine a first-stripe location range of the first disk group according to the read address, where at least one first stripe is included within the first-stripe location range.

The processor is further configured to sequentially read data from the at least one first stripe within the first-stripe location range.

The processor is further configured to set a data reading result for the current first stripe to preset padding data when data is not successfully read from a current first stripe, and continue to read data from a next first stripe until data is read from all the at least one first stripe.

The transmitter is configured to return a data reading result for each first stripe.

In an optional embodiment, the processor is further configured to check whether a state of each disk in the first disk group has changed, where the state of the disk is one of a new-disk state, a normal state, and a faulty state.

The processor is further configured to format a first disk when the first disk in the first disk group changes from the faulty state to the new-disk state, divide the formatted first disk into stripes, and set a state of each stripe that is obtained by division to a not-written state.

In an optional embodiment, the processor is further configured to set a data reading result for the stripe in the not-written state to preset padding data during data reading from a stripe in the not-written state.

In an optional embodiment, the processor is further configured to check whether the first disk group is currently in a read-only state, where the read-only state indicates that at least two disks in the first disk group are in a faulty state.

The processor is further configured to determine whether a last detected state of the first disk group is the read-only state when the first disk group is currently in a non-read-only state.

The processor is further configured to set the state of the first disk group to the non-read-only state when the last detected state of the first disk group is the read-only state, where the non-read-only state includes a degraded state and a normal read/write state.

In an optional embodiment, the processor is further configured to determine whether a last detected state of the first disk group is the non-read-only state when the first disk group is currently in the read-only state.

The processor is further configured to set the state of the first disk group to the read-only state when the last detected state of the first disk group is the non-read-only state.

According to the terminal provided in this embodiment, data is sequentially read within a first-stripe location range of a first disk group, where the first-stripe location range is determined according to an acquired read address that is carried in a data read request for the first disk group, a data reading result for a first stripe whose data is not successfully read is set to preset padding data, data reading proceeds to a next first stripe until data is read from all first stripes, and a data reading result for each first stripe is returned, which reduces data loss and shortens access interruption time when data is not successfully read, and ensures data confidentiality because no third party is involved.

Embodiment 6

An embodiment of the present disclosure provides a data access terminal. The terminal is applied to a RAID, where the RAID includes at least a first disk group, the first disk group includes at least one disk, and each disk is divided in advance into at least one stripe. The terminal includes a processor and a receiver.

The receiver is configured to acquire a data write request for the first disk group, where the data write request carries a write address.

The processor is configured to determine a second-stripe location range of the first disk group according to the write address, where at least one second stripe is included within the second-stripe location range.

The processor is further configured to sequentially write data into the at least one second stripe within the second-stripe location range.

The processor is further configured to scan to learn a state of the first disk group when data is not successfully written into a current second stripe, where the state of the first disk group is one of a read-only state, a normal read/write state, and a degraded state.

The processor is further configured to continue to write data into a corresponding stripe in the second disk group until all data is written when the first disk group is in the read-only state.

In an optional embodiment, the processor is further configured to send an alarm in response when the first disk group is in the degraded state.

In an optional embodiment, the processor is further configured to check whether a state of each disk in the first disk group has changed, where the state of the disk is one of a new-disk state, a normal state, and a faulty state.

The processor is further configured to format a first disk when the first disk in the first disk group changes from the faulty state to the new-disk state, divide the formatted first disk into stripes, and set a state of each stripe that is obtained by division to a not-written state.

In an optional embodiment, the processor is further configured to check whether the first disk group is currently in a read-only state, where the read-only state indicates that at least two disks in the first disk group are in a faulty state.

The processor is further configured to determine whether a last detected state of the first disk group is the read-only state when the first disk group is currently in a non-read-only state.

The processor is further configured to set the state of the first disk group to the non-read-only state when the last detected state of the first disk group is the read-only state, where the non-read-only state includes a degraded state and a normal read/write state.

In an optional embodiment, the processor is further configured to determine whether a last detected state of the first disk group is the non-read-only state when the first disk group is currently in the read-only state.

The processor is further configured to set the state of the first disk group to the read-only state when the last detected state of the first disk group is the non-read-only state.

According to the terminal provided in this embodiment of the present disclosure, when data is not successfully written into a current second stripe, it is learned by scanning that a first disk group is in a read-only state, and data writing proceeds to a corresponding stripe of a second disk group until all data is written, thereby implementing data writing without rebuilding a disk group, which shortens access interruption time and ensures data confidentiality because no third party is involved.

It should be noted that, when the data access apparatus provided by the foregoing embodiments is used for data access, the division of the foregoing functional modules is merely used as an example. In actual application, the foregoing functions can be allocated to different functional modules and implemented according to a requirement, that is, an inner structure of the apparatus is divided into different functional modules to implement all or some of the functions described above. In addition, the data access apparatus provided in the foregoing embodiment belongs to a same idea as the embodiments of the data access method. For a specific implementation process thereof, reference is made to the method embodiments, and details are not described herein again.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A data access method, wherein the data access method is applied to a redundant array of independent disks, wherein the redundant array of independent disks comprises a first disk group and a second disk group, wherein the first disk group comprises at least one disk, wherein each disk is divided in advance into at least one stripe, wherein each stripe comprises a plurality of stripe units, wherein the plurality of stripe units from the first disk group form a parity group, and wherein the data access method comprises:
    acquiring a data write request for the first disk group, wherein the data write request carries a write address;
    determining a first stripe location range of the first disk group according to the write address, wherein at least one stripe unit is comprised within the first stripe location range;
    sequentially writing the data into the at least one stripe within the first stripe location range;
    scanning to learn a state of the first disk group when the data is not successfully written into a current stripe;
    continuing to write the data into a corresponding stripe in the second disk group until all the data is written in response to determining that the first disk group is in a read-only state;
    acquiring a data read request for the first disk group, wherein the data read request corresponds to a second stripe location range, and wherein the second stripe location range is a subset of the parity group;
    detecting that a preset quantity of stripe units in the second stripe location range cannot be read, wherein the preset quantity of stripe units belongs to a same stripe, and wherein the preset quantity of stripe units corresponds to a number of stripe units that is greater than a number of stripe units that the redundant array of independent disks has error correcting capability to recover;
    setting a data reading result for the preset quantity of stripe units in the second stripe location range to preset padding data;
    returning data reading results for each stripe unit in the second stripe location range, wherein the data reading results include data read from stripe units in the second stripe location range and the preset padding data; and
    sending the data reading results including the: data read from the stripe units in the second stripe location range and the, preset padding data to a video playback application that is configured to play the data reading results including the preset padding data when the number of the stripe units is greater than the number of stripe units that the redundant array of independent disks has the error correcting capability to recover.

2. The data access method of claim 1, further comprising sending an alarm in response to the first disk group being in a degraded state.

3. The data access method of claim 1, further comprising:
    checking whether a state of each disk in the first disk group has changed, wherein the state of each disk is one of a new-disk state, a normal state, or a faulty state;
    formatting a first disk when the first disk in the first disk group changes from the faulty state to the new-disk state;
    dividing the formatted first disk into stripes when the first disk in the first disk group changes from the faulty state to the new-disk state; and setting a state of each stripe that is obtained by division to a riot-written state when the first disk in the first disk group changes from the faulty state to the new-disk state.

4. The data access method of claim 3, wherein after setting the state of each stripe that is obtained by division to the not-written state, the method further comprises setting the data reading result for a stripe in the not-written state to the preset padding data during the data reading from the stripe in the not-written state.

5. The data access method of claim 1, further comprising:
checking whether the first disk group is currently in a read-only state, wherein the read-only state indicates that at least two disks in the first disk group are in a faulty state;
determining whether a last detected state of the first disk group is the read-only state when the first disk group is currently in a non-read-only state; and
setting a state of the first disk group to the non-read-only state when the last detected state of the first disk group is the read-only state, wherein the non-read-only state comprises a degraded state and a normal read/write state.

6. The data access method of claim 1 wherein after checking whether the first disk group is currently in the read-only state, the method further comprises:
determining whether the last detected state of the first disk group is the non-read-only state when the first disk group is currently in the read-only state; and
setting the state of the first disk group to the read-only state when the last detected state of the first disk group is the non-read-only state.

7. The data access method of claim 1, wherein the redundant array of independent disk comprises a redundant array of independent disk array 5 (RAID 5) of disks arrays.

8. The data access method of claim 1, wherein the video playback application comprises a video streaming application.

9. The data access method of claim 1, further comprising playing back the data reading results including the preset padding data.

10. The data access method of claim 1, wherein the video playback application comprises a video streaming application, wherein the method further comprises playing back the data reading results including the preset padding data in the video streaming application, and wherein playing back the preset padding data in the video streaming application comprises playing back video with frame freezing.

11. The data access method of claim 1, wherein the video playback application comprises a video streaming application, wherein the method further comprises playing back the data reading results including the preset padding data in the video streaming application, and wherein playing back the preset padding data in the video streaming application comprises playing back video with artifacts.

12. The data access method of claim 1, wherein the video playback application comprises a video streaming application, wherein the method further comprises playing back the data reading results including the preset padding data in the video streaming application, and wherein playing back the preset padding data in the video streaming application comprises playing back video with frame freezing and artifacts.

13. The data access method of claim 1, wherein the video playback application comprises a video streaming application, wherein the method further comprises playing back the data reading results including the preset padding data in the video streaming application, and wherein playing back the preset padding data in the video streaming application comprises playing back video with intermittent playing back of the video.

14. The data access method of claim 1, wherein the preset padding data comprises a preset number.

15. A data access apparatus, wherein the data access apparatus is applied to a redundant array of independent disks, wherein the redundant array of independent disks comprises at least a first disk group and a second disk group, he the first disk group comprises at least one disk, wherein each disk is divided in advance into at least one stripe, wherein each stripe comprises a plurality of stripe units, wherein the plurality of stripe units form a parity group, and wherein the data access apparatus comprises:
a receiver configured to acquire a data write request and a data read request for the first disk group, wherein the data write request carries a write address, and wherein the data read request carries a read address; and
a processor coupled to the receiver and configured to:
determine a first stripe location range of the first disk group according to the write address, wherein at least one second stripe is included within the first stripe location range;
sequentially write data into the at least one second stripe within the first stripe location range;
scan to learn a state of the first disk group when the data is not successfully written into a current second stripe;
continue to write the data into a corresponding stripe in the second disk group until all data is written in response to determining that the first disk group is in a read-only state;
determine a second stripe location range of the first disk group according to the read request, wherein the second stripe location range a subset of the parity group;
detect that a preset quantity of stripe units in the second stripe location range cannot be read, wherein the preset quantity of stripe units belong to a same stripe, and wherein the preset quantity of stripe units corresponds to a number of stripe units that is greater than a number of stripe units that the redundant array of independent disks has error correcting capability to recover;
set a data reading result for the preset quantity of stripe units in the second stripe location range to preset padding data;
return data reading results for each stripe unit in the second stripe location range, wherein the data reading results include data read from stripe units in the second stripe location range and the preset padding data; and
send the data reading results including the data read from the stripe units in the second stripe location range and the preset padding data to a video playback application that is configured to play the data reading results including the preset data when the number of the stripe units is greater than the number of stripe units that the redundant array of independent disks has the error correcting capability to recover.

16. The data access apparatus of claim 15, wherein the processor is further configured to send an alarm when the first disk group is in a degraded state.

17. The data access apparatus of claim 15, wherein the processor is further configured to;

check whether a state of each disk in the first disk group has changed, wherein the state of each disk is one of a new-disk state, a normal state, or a faulty state;

format a first disk when the first disk in the first disk group changes from the faulty state to the new-disk state;

divide the formatted first disk into stripes; and set a state of each stripe that is obtained by division to a not-written state.

18. The data access apparatus of claim 15, wherein the processor is further configured to:

check whether the first disk group is currently in the read-only state, wherein the read-only state indicates that at least two disks in the first disk group are in a faulty state;

determine whether a last detected state of the first disk group is the read-only state when the first disk group is currently in a non-read-only state; and set the state of the first disk group to the non-read-only state when the last detected state of the first disk group is the read-only state, wherein the non-read-only state comprises a degraded state and the normal read/write state.

19. The data access apparatus of claim 18, wherein the processor is further configured to:

determine whether the last detected state of the first disk group is the non-read-only state when the first disk group is currently in the read-only state; and set the state of the first disk group to the read-only state when the last detected state of the first disk group is the non-read-only state.

20. The data access apparatus of claim 15, wherein the redundant array of independent disk comprises a redundant array of independent disk array 5 (RAID 5) of disks arrays.

* * * * *

UNITED STATES PATENT AND TRADEMARK OFFICE
CERTIFICATE OF CORRECTION

PATENT NO. : 10,585,600 B2
APPLICATION NO. : 15/203645
DATED : March 10, 2020
INVENTOR(S) : Xiaoliang Chen et al.

Page 1 of 1

It is certified that error appears in the above-identified patent and that said Letters Patent is hereby corrected as shown below:

In the Claims

Claim 1, Column 18, Line 47: "the: data read" should read "the data read"

Claim 1, Column 18, Line 49: "and the, preset padding" should read "and the preset padding"

Claim 3, Column 19, Line 2: "a riot-written state" should read "the not-written state"

Claim 15, Column 20, Line 11: "he the first disc" should read "wherein the first disc"

Claim 15, Column 20, Line 58: "the preset data when" should read "the preset padding data when"

Signed and Sealed this
Fourth Day of August, 2020

Andrei Iancu
*Director of the United States Patent and Trademark Office*